United States Patent
Ham

(10) Patent No.: US 7,125,028 B2
(45) Date of Patent: Oct. 24, 2006

(54) LOWER ARM ASSEMBLY OF A VEHICLE

(75) Inventor: Hyoung Seung Ham, Seoul (KR)

(73) Assignee: Kia Motors Corporation, Seoul (KR)

( * ) Notice: Subject to any disclaimer, the term of this patent is extended or adjusted under 35 U.S.C. 154(b) by 383 days.

(21) Appl. No.: 10/747,904

(22) Filed: Dec. 29, 2003

(65) Prior Publication Data
US 2005/0082784 A1 Apr. 21, 2005

(30) Foreign Application Priority Data
Oct. 21, 2003 (KR) .................. 10-2003-0073368

(51) Int. Cl.
B60G 11/26 (2006.01)
(52) U.S. Cl. .................. 280/124.134; 280/124.16
(58) Field of Classification Search ......... 280/124.134, 280/124.135, 5.516, 124.13, 124.157, 124.161; 267/140.12, 140.11, 141.2
See application file for complete search history.

(56) References Cited

U.S. PATENT DOCUMENTS

| 3,752,270 A | * | 8/1973 | Valdespino | 188/281 |
| 4,616,848 A | * | 10/1986 | Sugasawa et al. | 280/5.518 |
| 4,687,223 A | * | 8/1987 | Miyoshi et al. | 280/5.516 |
| 4,693,491 A | * | 9/1987 | Akatsu et al. | 280/124.108 |
| 4,697,795 A | * | 10/1987 | West | 267/186 |
| 5,178,406 A | * | 1/1993 | Reynolds | 280/124.106 |
| 5,427,395 A | * | 6/1995 | Urbach | 280/124.134 |
| 5,975,541 A | * | 11/1999 | Harara et al. | 280/5.524 |
| 6,007,072 A | * | 12/1999 | Yoon | 280/5.514 |
| 6,854,750 B1 | * | 2/2005 | Carlstedt et al. | 280/124.169 |

FOREIGN PATENT DOCUMENTS

| JP | 60-049147 | 3/1985 |
| JP | 60-188610 | 12/1985 |
| JP | 06-040229 | 2/1994 |
| JP | 06-064435 | 3/1994 |
| KR | 10199800008627 | 4/1998 |

* cited by examiner

Primary Examiner—Paul N. Dickson
Assistant Examiner—Leonard J. McCreary, Jr.
(74) Attorney, Agent, or Firm—Morgan Lewis & Bockius LLP

(57) ABSTRACT

A lower arm assembly comprises a lower arm, a front fluid-filled bushing, a rear fluid-filled bushing, and a fluid transferring pipe extending between the bushings. Each of the front and rear bushings has an outer pipe, an inner pipe, and a shock absorbing member. A fluid chamber is formed within the shock absorbing member. The fluid transferring pipe connects the fluid chambers of the front and rear bushings together such that the fluid can transfer between the fluid chambers. Therefore, with the lower arm assembly according to the embodiment of the present invention, riding comfort and cornering stability can be simultaneously improved.

2 Claims, 5 Drawing Sheets

LOWER ARM ASSEMBLY OF A VEHICLE

CROSS-REFERENCE TO RELATED APPLICATIONS

This application claims priority of Korean Application No. 10-2003-0073368, filed on Oct. 21, 2003.

FIELD OF THE INVENTION

The present invention relates to a lower arm assembly for a vehicle.

BACKGROUND OF THE INVENTION

A suspension system of a vehicle is a device for absorbing shocks transmitted from a road. The suspension system typically includes, for each wheel, a knuckle that receives the wheel with the knuckle being supported from below by a lower trailing arm and from above by a shock absorber cooperating with a coil spring.

The lower arm is coupled to the sub frame of the vehicle through front and rear bushings. When the vehicle is running in a straight line, shape of the front bushing and the rear bushing are oppositely distorted. That is, when a shock is transferred to a vehicle body in a rearward direction, as shown in FIG. 3A, the front bushing is outwardly distorted and the rear bushing is inwardly distorted. To improve riding comfort, distortions of the front and rear bushings must be maximnized.

When the vehicle is cornering, lateral force is transmitted to the lower arm, so that in the case of cornering to the right the front and rear bushings are inwardly distorted at the same time. Under these conditions, for a cornering stability, distortions of the rear and front bushings must be minimized. However, the conventional lower arm cannot satisfy the opposite requirements for straight line and cornering operation at the same time.

The information disclosed in this Background of the Invention section is only for enhancement of understanding of the background of the invention and should not be taken as an acknowledgement or any form of suggestion that this information forms the prior art that is already known to a person skilled in the art.

SUMMARY OF THE INVENTION

Embodiments of the present invention provide a lower arm assembly in which distortion characteristics of bushings are changed according to driving conditions to increase both riding comfort and driving stability.

In a preferred embodiment of the present invention, a lower arm assembly comprises a lower arm, a front bushing, a rear bushing, and a fluid transferring pipe. The front bushing has a first outer pipe, a first inner pipe, and a first shock absorbing member. The first inner pipe is disposed within the first outer pipe and is connected to a vehicle body. The first shock absorbing member is disposed between the first outer pipe and the first inner pipe, and a first fluid chamber is formed within the first shock absorbing member. The first fluid chamber is filled with a fluid. The rear bushing has a second outer pipe, a second inner pipe, and a second shock absorbing member. The second inner pipe is disposed within the second outer pipe and is connected to the vehicle body. The second shock absorbing member is disposed between the second outer pipe and the second inner pipe, and a second fluid chamber is formed within the second shock absorbing member. The second fluid chamber is filled with a fluid. The fluid transferring pipe connects the first and second fluid chambers together such that the fluid can transfer between the first and second fluid chambers.

It is preferable that volumes of the first and second fluid chambers are respectively less than volumes of the first and second shock absorbing members.

It is also preferable that each of the first and second shock absorbing members is made of a rubber material.

In a further embodiment, a lower arm assembly comprises a lower arm having a front end, a rear end and an intermediate extension. A knuckle coupling is disposed on the intermediate extension for coupling with a wheel knuckle. A front bushing, disposed at the front end of the lower arm, is configured for connection to a vehicle body. The front bushing includes a resilient-walled fluid chamber. A rear bushing is configured for connection to the vehicle body and is disposed at the rear end of the lower arm. The rear bushing includes a resilient-walled fluid chamber. A fluid passageway extends between the fluid chambers. A fluid passageway is formed within the lower arm.

In another further embodiment, each bushing of the lower arm assembly comprises an outer pipe, an inner pipe disposed within the outer pipe, and a shock absorbing material disposed between the inner and outer pipes. The resilient-walled fluid chamber is defined within the shock absorbing material.

BRIEF DESCRIPTION OF THE DRAWINGS

The accompanying drawings, which are incorporated in and constitute a part of the specification, illustrate an embodiment of the invention, and, together with the description, serve to explain the principles of the invention, where.

DETAILED DESCRIPTION OF THE PREFERRED EMBODIMENTS

Hereinafter, a preferred embodiment of the present invention will be described in detail with reference to the accompanying drawings.

Figure 1:
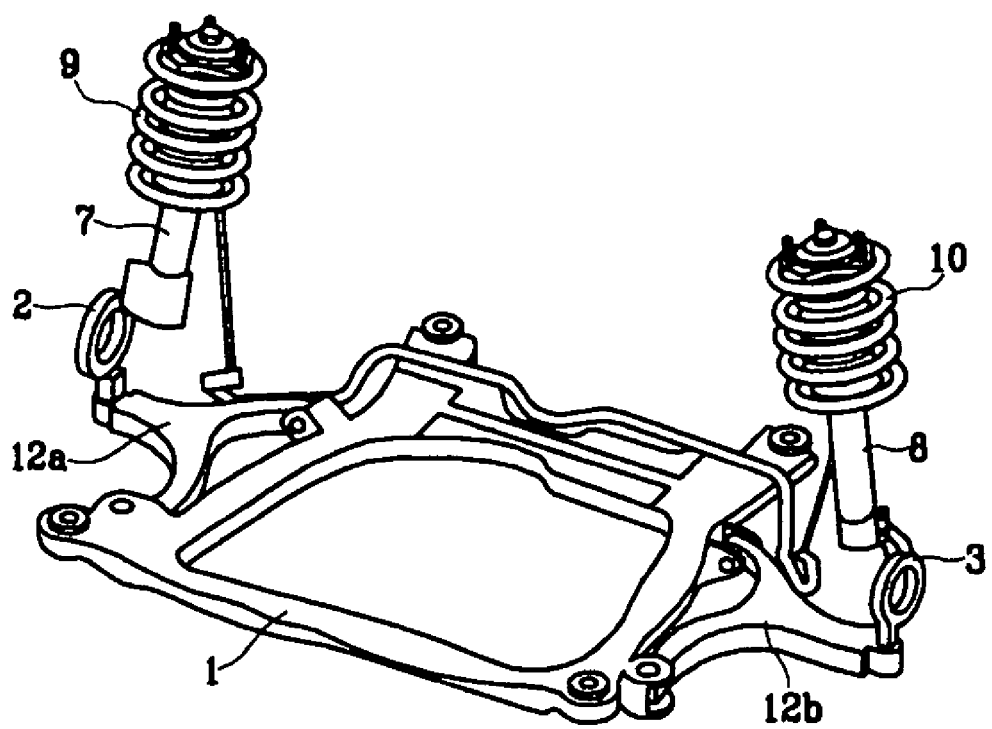
FIG. 1 is a schematic perspective view of a suspension system of a vehicle according to an embodiment of the present invention.

As shown in FIG. 1, in a suspension system, according to an embodiment of the invention, lower arm assemblies 12a,b are coupled to knuckles 2 and 3 of left and right wheels, respectively, and are connected to a sub frame 1. Shock absorbers 7 and 8 are coupled respectively to the knuckles 2 and 3, and coil springs 9 and 10 are coupled respectively to the shock absorbers 7 and 8.

Figure 2:
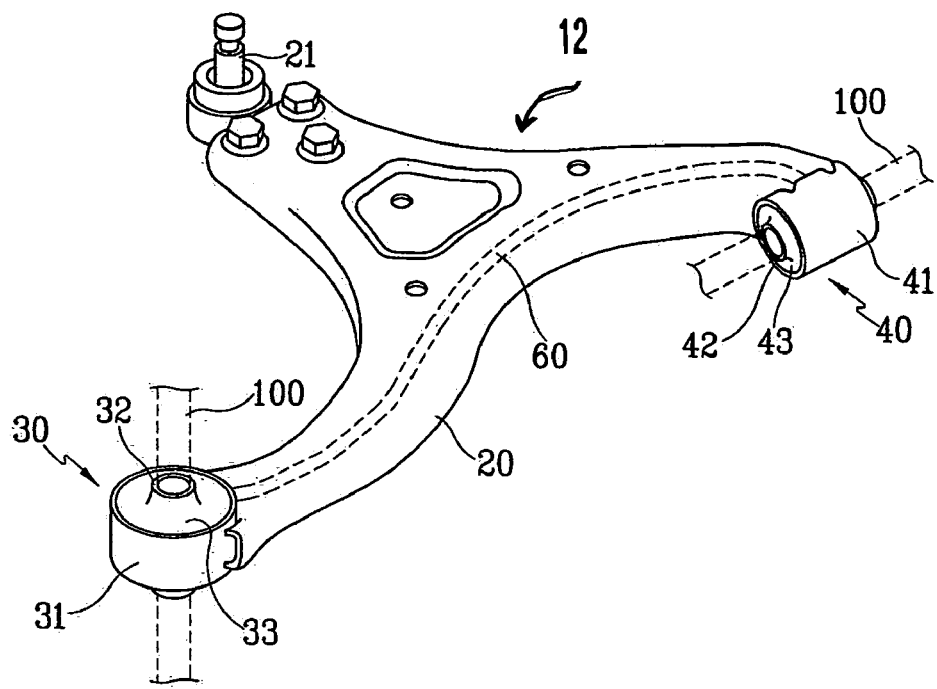
FIG. 2 shows a lower arm assembly according to an embodiment of the present invention.

As shown in FIG. 2, a lower arm assembly 12 according to an embodiment of the present invention comprises a lower arm 20, a front bushing 30, and a rear bushing 40. The front and rear bushings 30 and 40 are fixedly coupled to the lower arm 20. A coupling portion 21 is provided for coupling with the knuckles 2, 3.

Figure 3:
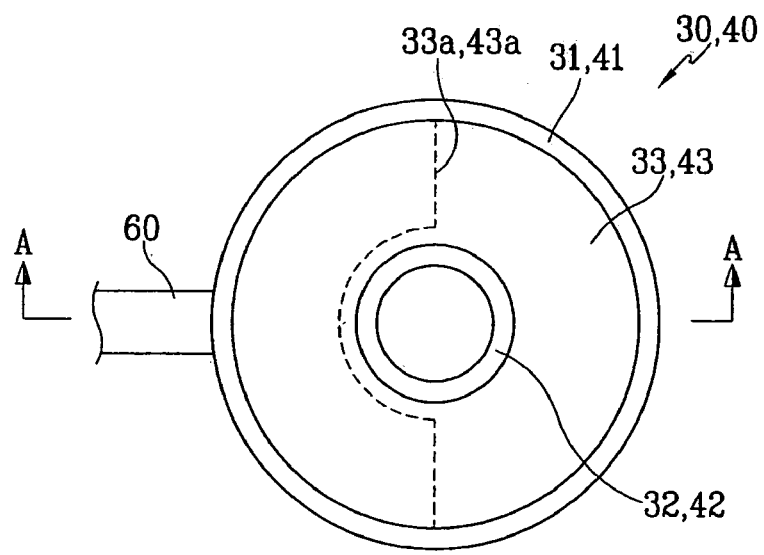
FIG. 3 shows a front bushing and a rear bushing of a lower arm assembly according to an embodiment of the present invention.
Figure 4:
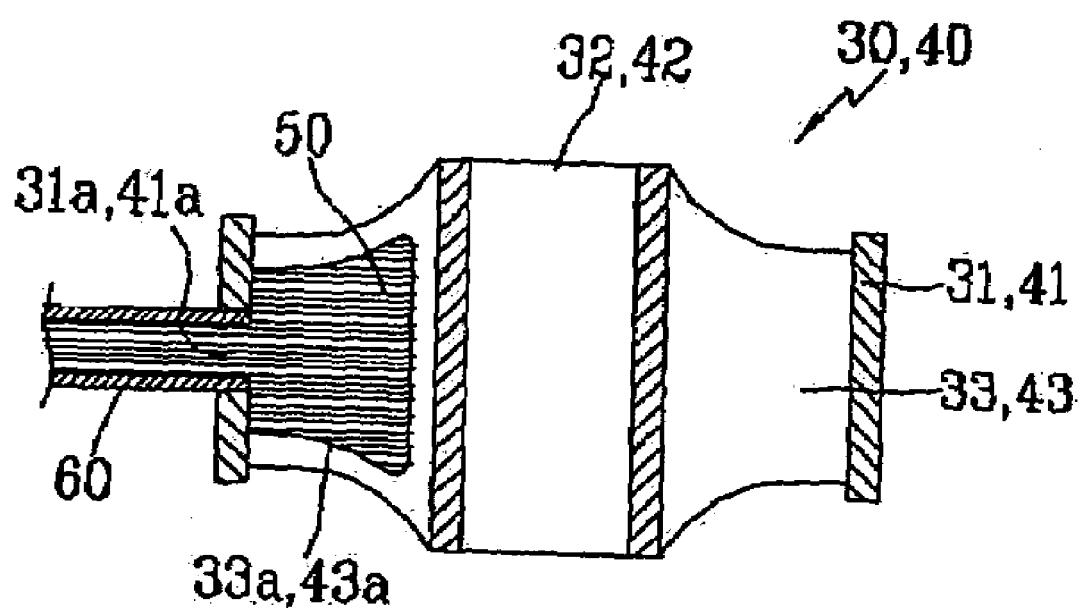
FIG. 4 shows a cutaway view of the front bushing and the rear bushing of the lower arm assembly of FIG. 3 along a plane A—A.

As shown in FIGS. 3 and 4, the front bushing 30 includes an outer pipe 31, an inner pipe 32, and a shock absorbing member 33 that is disposed between the outer pipe 31 and the inner pipe 32. Similarly, the rear bushing 40 includes an outer pipe 41, an inner pipe 42, and a shock absorbing member 43 that is disposed between the outer pipe 41 and the inner pipe 42.

The lower arm assembly 12 is connected to the vehicle body 100 through the front bushing 30 and the rear bushing 40. That is, the outer pipes 31 and 41 are fixedly coupled to the lower arm 20, and the inner pipes 32 and 42 are fixedly coupled to the vehicle body 100.

The shock absorbing members 33 and 43 can be made of any suitable material that absorbs shock. As an example, the shock absorbing members 33 and 43 can be made of a rubber. Appropriate materials may be selected by persons skilled in the art based on particular suspension requirements.

Fluid chambers 33a and 43a are formed respectively in the shock absorbing members 33 and 43. For example, the fluid chambers 33a and 43a are formed respectively in outer halves of the shock absorbing members 33 and 43.

The fluid chambers 33a and 43a are filled with a fluid 50, and it is preferable that volumes of the fluid chambers 33a and 43a are respectively less than half the volumes of the shock absorbing members 33 and 43.

A through hole 31a communicating with the fluid chamber 33a is formed in the outer pipe 31 of the front bushing 30, and a through hole 41a communicating with the fluid chamber 43a is formed in the outer pipe 41 of the rear bushing 40. A fluid transferring pipe 60 is connected respectively to the through holes 31a and 41a, so that the fluid chambers 33a and 43a communicate with each other. That is, the fluid 50 filling the fluid chambers 33a and 43a can move both ways through the fluid transferring pipe 60. As shown in FIG. 4, the fluid transferring pipe 60 is preferably disposed within the lower arm 20.

Hereinafter, operation of the lower arm assembly 12 according to an embodiment of the present invention will be explained.

Figure 5A:
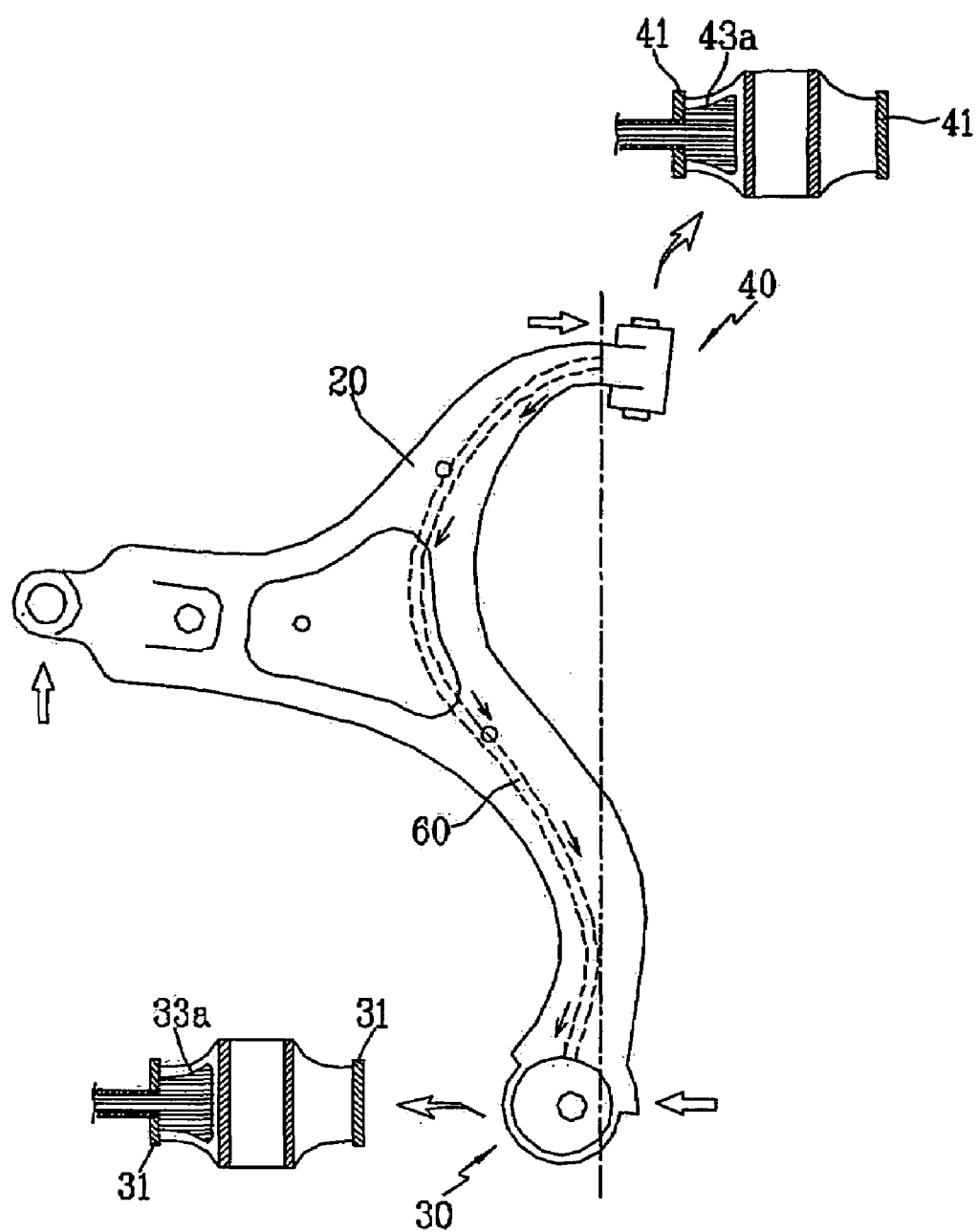
FIGS. 5A and 5B show operation of a lower arm assembly according to an embodiment of the present invention.

As shown in FIG. 5A, if a load is transmitted to the lower arm 20 in a rear direction of a vehicle by shocks from a road surface while a vehicle is running, the outer pipe 41 of the rear bushing 40 moves inwardly (i.e., toward the vehicle body), so that the fluid chamber 43a within the shock absorbing member 43 is contracted. At the same time, the outer pipe 31 of the front bushing 30 moves outwardly (i.e., away from the vehicle body), so that the fluid chamber 33a within the shock absorbing member 33 is expanded.

Accordingly, the fluid residing in the fluid chamber 43a of the rear bushing 40 is transferred to the fluid chamber 33a of the front bushing 30 through the fluid transferring pipe 60.

Consequently, changes of shapes of the front bushing 30 and the rear bushing 40 increase so that riding comfort can be improved.

Figure 5B:
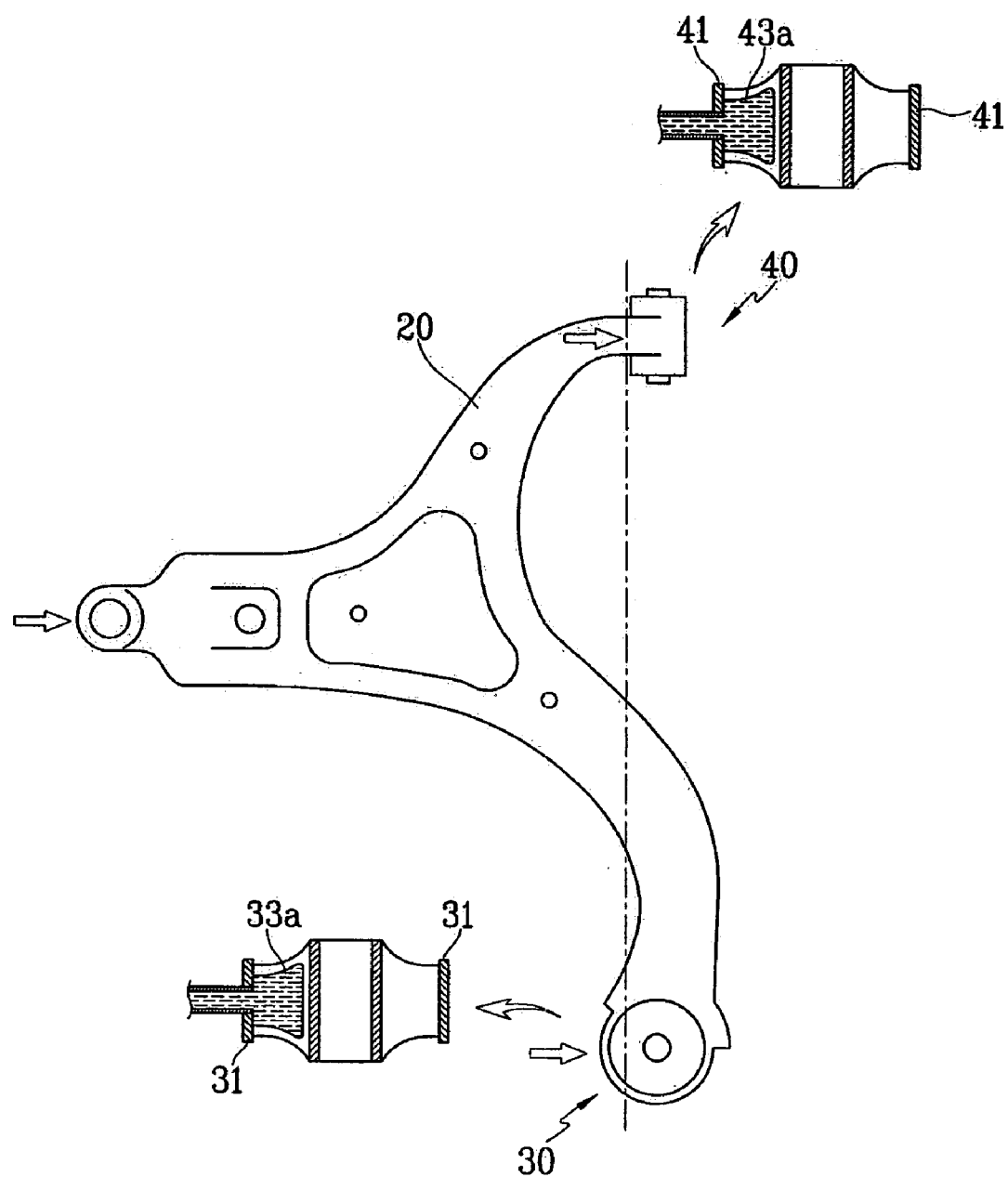

As shown in FIG. 5B, if a load is transmitted to the lower arm 20 in an inward direction (i.e. toward the vehicle body) while the vehicle is cornering, the outer pipes 31 and 41 of the front bushing 30 and the rear bushing 40 are simultaneously pushed inwardly (i.e., toward the vehicle body), the fluid chambers 43a and 33a are simultaneously pressurized so that fluid transferring between the fluid chambers 43a and 33a does not occur, and the bushings 30 and 40 become very rigid because the fluid does not compress. Accordingly, cornering stability of the vehicle is improved.

As stated in the above, according to an embodiment of the present invention, while the vehicle is running in a straight line the bushings are fairly pliable so that riding comfort can be improved, and while the vehicle is cornering, the rigidity of the bushings is increased so that the cornering stability can be improved.

Although preferred embodiments of the present invention have been described in detail hereinabove, it should be clearly understood that many variations and/or modifications of the basic inventive concepts herein taught which may appear to those skilled in the present art will still fall within the spirit and scope of the present invention, as defined in the appended claims.

What is claimed is:

1. A lower arm assembly, comprising:
   a lower arm having a front end, a rear end and an intermediate extension;
   a knuckle coupling disposed on the intermediate extension for coupling with a wheel knuckle;
   a front bushing configured for connection to a vehicle body disposed at the front end of the lower arm, said front bushing including a resilient-walled fluid chamber;
   a rear bushing configured for connection to the vehicle body disposed at the rear end of the lower arm, said rear bushing including a resilient-walled fluid chamber; and
   a fluid passageway extending between said fluid chambers, wherein the fluid passageway is formed within the lower arm.

2. The lower arm assembly of claim 1, wherein each said bushing comprises:
   an outer pipe;
   an inner pipe disposed within the outer pipe; and
   a shock absorbing material disposed between the inner and outer pipes, said resilient-walled fluid chamber being defined within said shock absorbing material.

* * * * *